United States Patent [19]

Török

[11] 4,246,527
[45] Jan. 20, 1981

[54] SUPPLY EQUIPMENT FOR A SYNCHRONOUS MACHINE

[75] Inventor: Vilmos Török, Lidingö, Sweden

[73] Assignee: ASEA Aktiebolag, Vesteras, Sweden

[21] Appl. No.: 4,798

[22] Filed: Jan. 19, 1979

[30] Foreign Application Priority Data

Jan. 27, 1978 [SE] Sweden ............................... 7801011

[51] Int. Cl.³ ............................................. H02P 5/28
[52] U.S. Cl. .................................... 318/721; 318/722; 318/801
[58] Field of Search ............... 318/720, 721, 722, 723, 318/807, 810, 811, 812, 138, 254, 701, 799, 800, 801; 363/136, 135, 37

[56] References Cited

U.S. PATENT DOCUMENTS 3,995,203  11/1976  Török .................................. 318/701

FOREIGN PATENT DOCUMENTS 1438535   1/1969   Fed. Rep. of Germany ........... 363/136
2901836   8/1979   Fed. Rep. of Germany ........... 318/721
1069575   7/1954   France ................................... 318/138
1174774  12/1969   United Kingdom .................... 363/135

Primary Examiner—J. V. Truhe
Assistant Examiner—Richard M. Moose
Attorney, Agent, or Firm—Pollock, Vande Sande & Priddy

[57] ABSTRACT

An improved current supply apparatus for the power windings of a synchronous machine wherein a first center tap of a first power winding is connected to one side of a current source and a second center tap of a second power winding is connected to the other side of the current source. The respective ends of the power windings are connected by thyristors that are ignited at times determined by the angular position of a rotor of the synchronous machine. Each thyristor is ignited to conduct current during one-fourth of a power supply cycle to generate an output current of changing polarity that is applied to the power windings to drive the synchronous machine.

10 Claims, 4 Drawing Figures

SUPPLY EQUIPMENT FOR A SYNCHRONOUS MACHINE

BACKGROUND OF THE INVENTION

The invention relates to a current supply apparatus for a synchronous machine, and, more particularly, to such apparatus including means for supplying current to at least two power windings of the machine and including switching means for changing the polarity of the current that is applied to the power windings.

It is known in the art to supply current of periodically changing polarity to the windings of a synchronous machine to operate the machine. For example, in the U.S. Pat. No. 3,995,203, at FIG. 7 there is shown a reluctance machine having first and second power windings that are supplied with driving current from a current source. Each of the windings has a center tap and the center taps are connected by means of an excitation winding. The ends of the first power winding are connected to one terminal of the current source through respective thyristors. Likewise, the ends of the other power winding are connected to the second terminal of the current source through additional respective thyristors.

In this prior art power supply system, two thyristors must operate simultaneously to conduct supply current to the power windings. In addition, since the supply current must always pass through two series-connected thyristors, there is an appreciable voltage drop that is particularly noticeable at low operating voltages. Furthermore, since each of the thyristors must conduct to carry current during half of a power supply cycle, the power handling capacity of the thyristors must be relatively large.

There are significant losses in such a prior art system, particularly at low operating voltages, and the losses cause an appreciable deterioration in the total operational efficiency of the power supply apparatus of the system.

Accordingly, it is an object of the invention to provide a simple and effective means to apply current of changing polarity to the power windings of a synchronous machine in a system having lower losses and, therefore, greater efficiency.

A further object of the invention is to provide such a current supply system wherein thyristors having a lower rated current capacity may be used.

Another object of the invention is to provide a current supply apparatus wherein only one controllable switching means is operable at a time to conduct current to the power windings of the synchronous machine, thereby reducing the voltage drop associated with such apparatus by one-half.

A further object of the invention is to provide a current supply apparatus for a synchronous machine wherein each switching thyristor of the apparatus carries current only during one-fourth of a power supply cycle so that thyristors having lower rated current carrying capacities may be used.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the improved current supply apparatus, according to the invention, includes at least two power windings that receive current from a current source and operate to drive a synchronous machine. The current source is electrically connected to a center tap on a first power winding so that source current may pass through the winding in one of two directions.

One end of the first power winding is connected to a first end of a second power winding through a first thyristor and is also connected to a second end of the second power winding through a second thyristor. The opposite end of the first power winding is connected to the first end of the second power winding through a third thyristor and is also connected to the second end of the second power winding through a fourth thyristor. The thyristors are ignited at times corresponding to particular positions of a rotor of the synchronous machine and the conducting thyristors are operated to apply supply current of a particular polarity to the power windings of the synchronous machine.

A center tap on the second power winding is electrically connected to the current source to complete the electrical circuit.

An alternate embodiment of the invention may use interphase transformer inductors to create artificial center taps for the power windings. In addition, the apparatus of the invention may be used to supply current to synchronous machines having more than one pair of power windings.

DETAILED DESCRIPTION OF PREFERRED EMBODIMENTS

Figure 1:
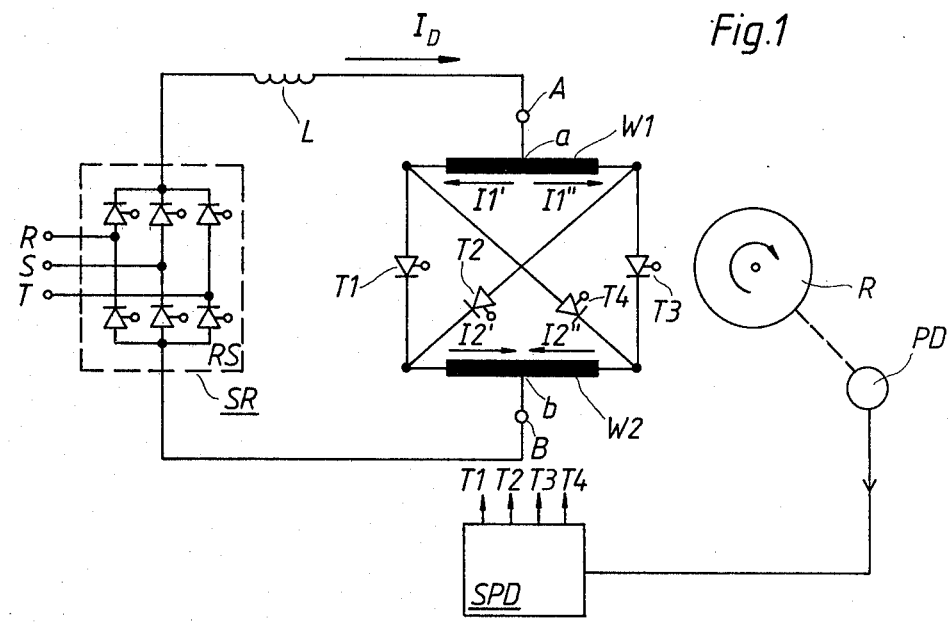
FIG. 1 shows a diagrammatic representation of a current supply apparatus for applying current to two power windings of a synchronous machine.

FIG. 1 shows an embodiment for supplying current of alternating polarity to a synchronous machine, for example, a reluctance machine, having two power windings, W1 and W2, and a rotor R. A current source is provided to supply current at a rate that is essentially independent of variations in the impedance and the back e.m.f of the power windings W1 and W2.

The current source of FIG. 1 includes a controllable rectifier SR and a smoothing inductor 1. The rectifier may, for example, comprise a three-phase thyristor bridge, that is supplied from a three-phase network, R, S, T. Of course, the magnitude of the direct supply current $I_D$ may be set at a desired value by varying the DC output voltage of the rectifier.

The current from the current source is applied at two power terminals A and B. The power winding W1 is provided with a center tap, a, that is connected to the terminal A and the power winding W2 has a similar center tap, b, that is connected to the terminal B. One end of the winding W1 is connected through thyristors T1 and T4 to opposite ends of the winding W2. Likewise, the other end of the winding W1 is connected through thrysitors T2 and T3 to the opposite ends of the winding W2.

The synchronous machine has a rotor R that is connected to a rotor position transducer PD, for example a commutation switch. The transducer is used in a manner known to the art to provide output signals corresponding to the position of the rotor. The output signals of the transducer PD are applied to a control pulse device SPD that generates corresponding ignition signals for thyristors T1-T4 in a manner known to the art. Thus, the thyristors T1-T4 are ignited in a sequence corresponding to the changing position of the rotor R and an alternating supply current is thereby generated and applied to the power windings W1 and W2 to drive the synchronous machine.

Figure 2:
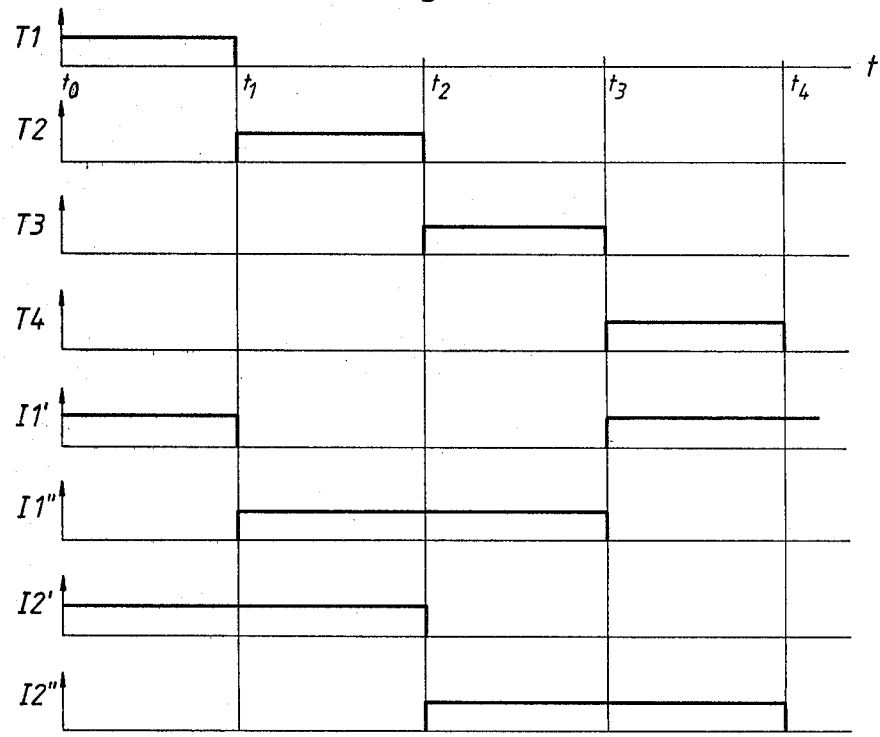
FIG. 2 shows timing diagrams of thryistor ignition periods and corresponding directions of current flow for the embodiment of FIG. 1.

FIG. 2 shows $^{(x)}$ the conducting interval for the thyristors during one current supply cycle. The thyristors T1-T4 are ignited at respective times $T_0$-$T_3$ so that each thyristor is conducting for one-fourth of the current supply cycle. Also, FIG. 2 illustrates the polarity of the supply current that flows in the windings W1 and W2 during a power supply cycle. For the interval t0-t1, the thyristor T1 is conducting and supply current $I_D$ flows through the left half of W1, T1 and the left half of W2. During this interval, $I1' = I2' = I_D$.

$^{(x)}$ Control circuits for current supply apparatus of this kind are well known in the prior art, for instance through the above-mentioned U.S. Pat. No. 3,995,203 or the published Swedish oatent application No. 401 758.

At $t_1$, the rotor position transducer PD generates a signal that is applied to the control pulse device SPD to ignite the thyristor T2. Thereafter, the ignited thyristor T2 and the machine voltage (e.m.f. induced in W1) cause the current to commutate from T1 to T2. Thus, the direction of the current flowing in the winding W1 is changed and the direction of current flow in the winding W2 remains the same.

During the interval $t_1$-$t_2$, $I_D$ flows through the right half of W1, thyristor T2 and the left half of W2. AT $t_2$, the rotor position transducer PD and control pulse device SPD operate to ignite the thyristor T3 and to commutate the current from T2 to T3 by means of the e.m.f. that is induced in the winding W2. Of course, from $t_2$ to $t_3$ supply current flows through the right half of the winding W1, the thyristor T3 and the right half of the winding W2.

In a similar manner, at $t_3$ the thyristor T4 is caused to ignite and the current is commutated from T3 to T4 to change the direction of current flow in the winding w1.

Figure 3:
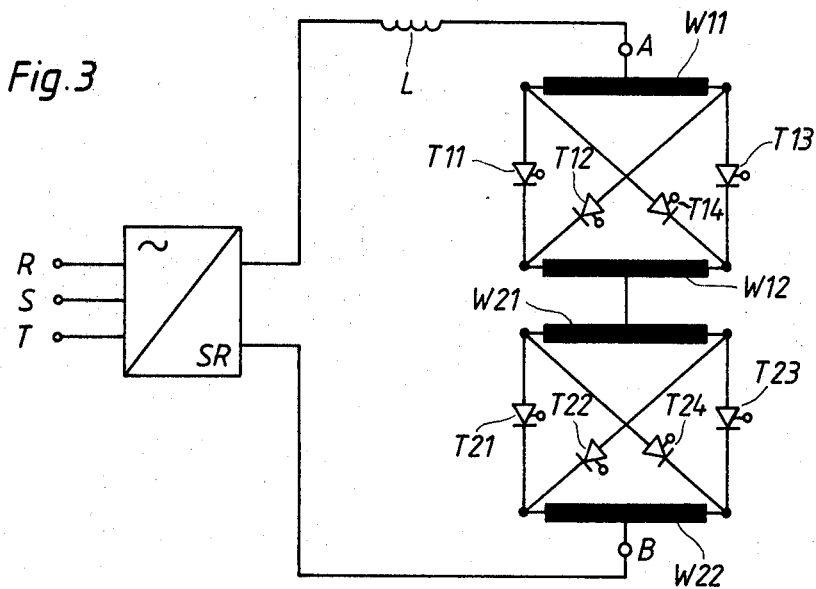
FIG. 3 illustrates a diagrammatic representation of an embodiment of the invention for supplying current to two pairs of power windings of a synchronous machine.

FIG. 3 shows an embodiment of the invention that is employed to supply four power windings of a synchronous machine. The embodiment of FIG. 3 includes a first part having a pair of power windings W11 and W12 and associated thyristors T11-T14 that are interconnected in the manner described for the embodiment of FIG. 1. A second part, including windings W21 and W22 and associated thyristors T21 and T24 is also interconnected as shown in FIG. 1. The first and second parts are connected in series on their DC sides. Although the two parts of the embodiment of FIG. 3 may be independently controlled, the preferred embodiment of FIG. 3 uses a common rotor position transducer to define the sequence of ignition of the thyristors and the corresponding phases of the supply current in the windings.

Figure 4:
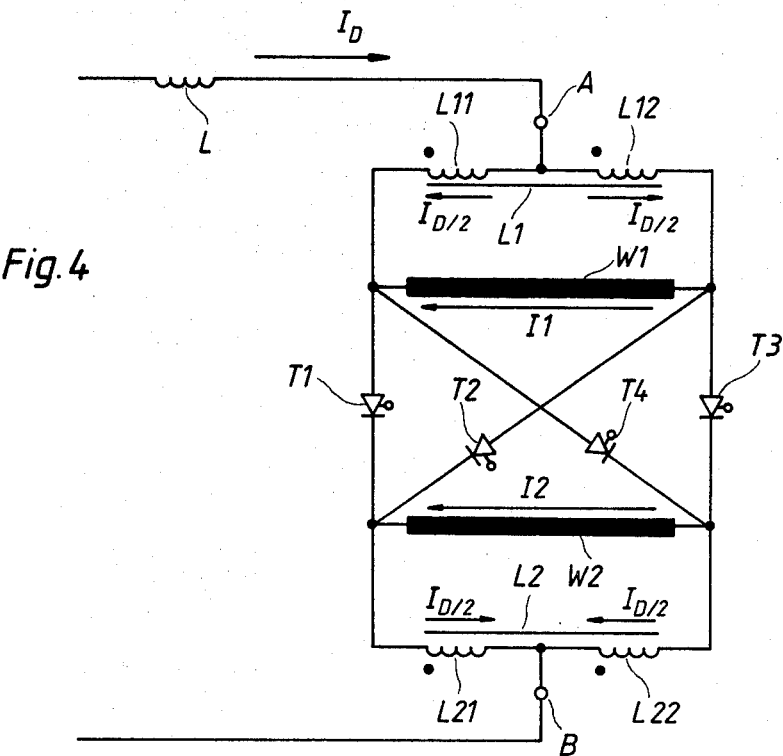
FIG. 4 shows a circuit diagram of an embodiment of the invention employing interphase transformer inductors to provide artificial center taps for the power windings of a synchronous machine.

FIG. 4 illustrates an embodiment of the invention that employs interphase transformer inductors to provide artificial center taps for the windings W1 and W2. An inductor L1 having two magnetically coupled windings L11 and L12 connected in parallel with the winding w1. A point intermediate the windings L11 and L12 is connected to the supply terminal A. In a corresponding manner, the windings L21 and L22 of an inductor L2 are connected in parallel with a power winding W2 and a point intermediate the windings L21 and L22 is connected to the supply terminal B. The inductors L1 and L2 operate as interphase transformers and the component windings of each inductor pass current of the same magnitude but traveling in opposite directions. Thus, the supply current $I_D$ is divided at L1, and one half of the current $I_D$ moves in one direction while the other half of $I_D$ moves in an opposite direction. More particularly, if either T1 or T4 is conducting, $I_1 = I_{D/2}$ and if either T2 or T3 is conducting, $I_1 = -I_{D/2}$. It should be appreciated that a similar current split will take place in the inductor L2 of the second power winding W2.

The above description shows how each power winding of the machine is provided with a center tap. However, if desired, each tap that is connected to the current supply may be displaced from the midpoint of the winding. In addition, although the power windings W1, W2 have each been described as a single unit, alternatively each winding could comprise two or more physically separate winding components intended to provide a cophasal (or anti-phase) alternating current.

In FIGS. 1 and 2 it has been shown how the thyristors are commutated with mutually equal commutating intervals, thereby providing currents through the two windings that are offset in phase by 90°. However, since the winding W2 and the winding W1 of FIG. 1 commutate independently, the thyristors may be controlled so as to obtain any particular phase displacement between the currents of the windings.

Although the disclosed embodiments of the invention are suitable for supplying current to one or two pairs of windings, it should be appreciated that the apparatus of the invention may be extended, for example as shown in FIG. 3, to supply current to any number of winding pairs of a synchronous machine.

It should also be understood that the current supply for the apparatus of the invention may be constructed in other ways than has been described, without departing from the spirit of the invention. For example, an uncontrolled diode rectifier may be connected to the network RST and may provide current of a controllable magnitude by means of a DC convertor and, possibly, a smoothing inductor.

The smoothing inductor L of FIG. 1 may be reduced in size or completely omitted if, for example, the excitation or series windings of a synchronous machine are connected with sufficiently high inductance to the current circuit through which the direct current $I_D$ passes.

Thyristors have been used in the disclosed preferred embodiments of the invention to commutate with the aid of the voltages that are induced in the power windings or, at low machine speeds, by periodic reductions in the supply current. However, it should be understood that other switching means may be used to produce such a commutation function without departing from the spirit of the invention.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. In an improved current supply apparatus of a type wherein first and second power connectors are connected to a current source for supplying at least a first and a second power winding of a synchronous machine with driving current to rotate a rotor of the synchronous machine, the improvement comprising:
   first tap means connected to said first power connector and said first power winding for passing at least a portion of said driving current in a particular direction through said first power winding;
   switching means for connecting each end of said first power winding to the ends of said second power winding and changing the polarity of the current flowing in at least one of the power windings in response to control signals corresponding to the angular position of said rotor; and
   second tap means connected to said second power connector and said second power winding to pass at least a portion of said driving current in a particular direction through said second power winding.

2. The current supply apparatus of claim 1 wherein said first tap means includes a center tap on said first power winding.

3. The current supply apparatus of claim 1 wherein said second tap means includes a center tap on said second power winding.

4. The current supply apparatus of claim 1 wherein said switching means includes a plurality of thyristors.

5. The current supply apparatus of claim 1 wherein said first tap means includes an inductor having end points connected to the end points of said first power winding and having an intermediate point connected to said current source.

6. The current supply apparatus of claim 1 wherein said second tap means includes an inductor having end points connected to the end points of said second power winding and having an intermediate point connected to said current source.

7. The current supply apparatus of claim 1 wherein said switching means includes a plurality of thyristors, each thyristor providing a connection between an end of said first power winding and a corresponding end of said second power winding.

8. A current supply apparatus for supplying current of changing polarity to rotate a rotor of a synchronous machine, comprising:
   current source means for generating a particular driving current;
   driving means including at least a pair of power winding members, each winding member responsive to at least a portion of said particular driving current to rotate the rotor of said synchronous machine;
   switching means connecting each end of one power winding member of said at least one pair to the ends of the other power winding member of the pair, said switching means responsive to control signals corresponding to the angular position of said rotor to periodically change the polarity of the driving current applied to at least one of the power winding members of said at least one pair;
   first tap means connected to said current source and operatively associated with said one power winding member of a winding member pair to pass at least a portion of said driving current through said one power winding member in a direction defined by the conducting state of said switching means; and
   second tap means connected to said current source and operatively associated with said other power winding member of the pair to pass at least a portion of said driving current through said other power winding member in a direction defined by the conducting state of said switching means.

9. The current supply apparatus of claim 8 wherein said switching means includes:
   first thyristor means for connecting a first end of said one power winding member to a corresponding first end of said other power winding member and responsive to said control signals to pass driving current for a first quarter of a current driving cycle;
   second thyristor means for connecting said first end of said one power winding member to a corresponding second end of said other power winding member and responsive to said control signals to pass driving current for a second quarter of said current driving cycle;
   third thyristor means for connecting a second end of said one power winding member to the corresponding second end of said other power winding member and responsive to said control signals to pass driving current for a third quarter of said current driving cycle; and
   fourth thyristor means for connecting said second end of said one power winding member to the corresponding first end of said other power winding member and responsive to said control signals to pass driving current for a fourth quarter of said current driving cycle.

10. The current supply apparatus of claim 8 including at least two pairs of power winding members, said pairs connected in series to receive said driving current.

* * * * *